June 17, 1930.　　　J. B. FLYNN　　　1,764,945
HANDLE MOUNTING
Filed July 11, 1928　　2 Sheets-Sheet 1
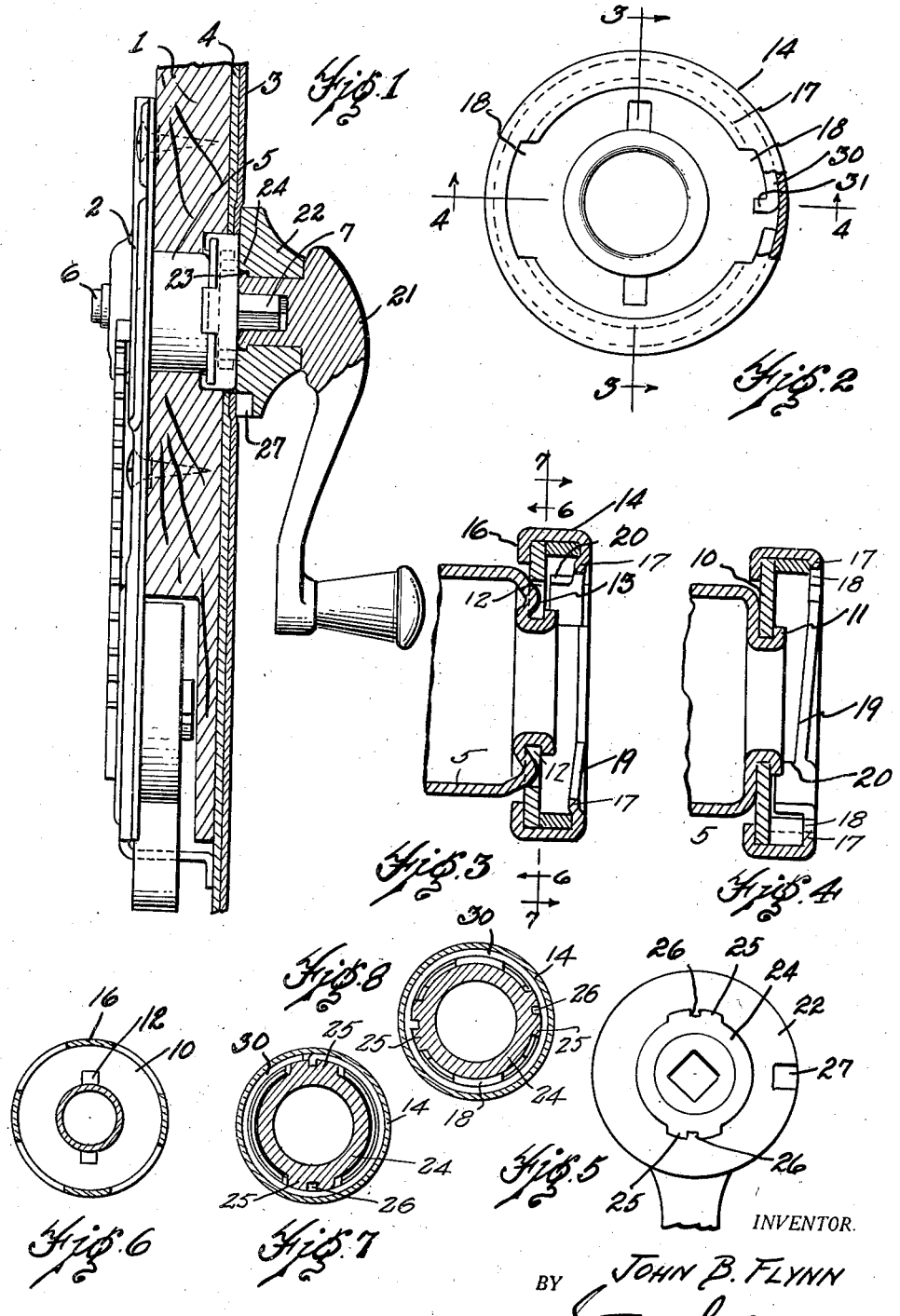
INVENTOR.
BY JOHN B. FLYNN
ATTORNEY.

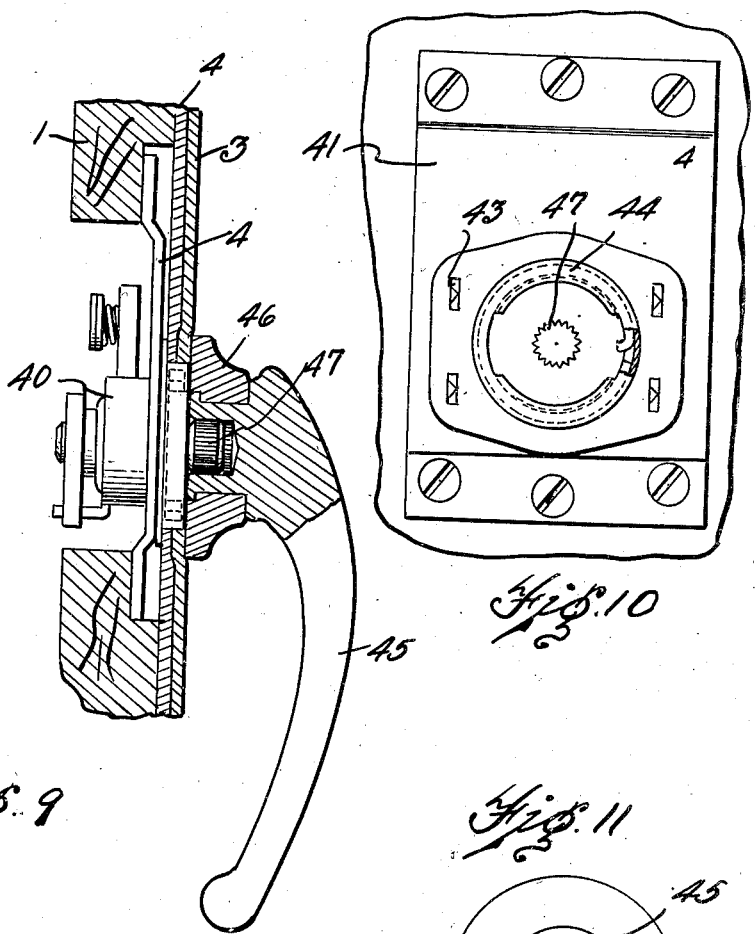

Patented June 17, 1930

1,764,945

UNITED STATES PATENT OFFICE

JOHN B. FLYNN, OF DETROIT, MICHIGAN, ASSIGNOR TO TERNSTEDT MANUFACTURING COMPANY, OF DETROIT, MICHIGAN, A CORPORATION OF MICHIGAN

HANDLE MOUNTING

Application filed July 11, 1928. Serial No. 291,717.

The present invention is concerned with a mounting for handles, and more specifically, the invention is directed toward a handle mounting which is especially useful for handles in automobile bodies, as for example, window regulator handles, door control handles, and the like.

The invention aims principally to provide a construction which is simple, yet one which makes for a very quick and easy assembly of the handle but which holds the handle from disassembly in a very positive manner so that the handle will not come loose while in use.

In the accompanying drawings:

Fig. 1 is a sectional view taken through the wall of an automobile body illustrating a window regulator handle mounted in accordance with the invention.

Fig. 2 is an elevation of a securing device to which the handle is mounted.

Fig. 3 is a sectional view taken on line 3—3 of Fig. 2.

Fig. 4 is a section on line 4—4 of Fig. 2.

Fig. 5 is an elevation of the rear face of the escutcheon in which the handle is rotatably mounted.

Fig. 6 is a sectional view taken on line 6—6 of Fig. 3 illustrating some of the holding parts in the mounting.

Fig. 7 is taken on line 7—7 of Fig. 3 illustrating the parts in which the handle is mounted.

Fig. 8 is a sectional view similar to Fig. 7 illustrating the parts when in locked position.

Fig. 9 is a sectional view through the wall of an automobile body illustrating a remote control handle mounted in accordance with the invention.

Fig. 10 is a face view of the member to which the handle is secured.

Fig. 11 is a face view of the escutcheon with the handle mounted therein.

In many automobile bodies there is what is known as a lockboard 1 upon which the locks for doors, window regulators and the like are mounted. In Fig. 1 a window regulator mechanism is shown generally as at 2. On the inside of the car the usual trimming is shown at 3 and there may be a filler strip 4 between the lockboard and the trimming.

The window regulator mechanism includes a hollow hub 5 in which is journaled a shaft 6 operably associated with the window regulator mechanism, which shaft has an end 7 suitably formed for attachment to an operating handle. The construction as thus far described is conventional in illustrating the mounting of the window regulator mechanism.

There is means fixed to the automobile wall construction to which the handle is connected, and this means may be mounted upon the hub construction 5. The means may take the form of a disk 10 having a central aperture, with the hub extending through the aperture and the metal being turned over as at 11. To keep the disk from turning, the same may be provided with slots 12 into which the metal of the hub is punched as at 13.

Over this disk there is placed a cup member 14 having extensions or legs 16 which extend through grooves in the edge of the disk (Fig. 6) with the legs turned over the rear side of the disk.

The inside part of this cup, that, is the side facing the interior of the automobile, is flanged inwardly, as at 17, and provided with spaced recesses 18 which form a double bayonet type fastening arrangement. The metal at the edge of the flange 17 is shaped to provide cam surfaces adjacent the recesses 18, there being a cam surface on each side of each recess. as at 19. The cams terminate in shoulders 20.

Thus it will be noted that the cup member with its double bayonet type slot arrangement is secured directly in the wall of the automobile. A regulator handle is shown at 21 and it is suitably journaled in a rose plate or escutcheon 22, as by means of the metal of the hub of the handle being spun over or otherwise flanged over as at 23. The hub of the handle has a recess adapted to fit over the end 7 of the shaft so that the handle may turn the shaft. The end 7 of the shaft and the recess in the hub may be square for this purpose.

The escutcheon 22 is equipped with an inwardly projecting part 24 having oppositely disposed projections 25, each of which is notched as at 26. As will later become apparent only one of these projections need to be notched, but in order to expedite the assembly it is advantageous to notch both of them.

This escutcheon plate is adapted to be secured to the cup by passing the projections 25 through the opposed recesses 18 and then turning the escutcheon to lock the projections 25 underneath flanges 17. By reason of the cam surfaces 19 there is a tightening action which draws the escutcheon up tightly against the cup and accordingly the escutcheon is mounted tightly against the trimming on the inside of the car. Preferably the arrangement is such that the escutcheon becomes tight before the projections 25 abut against shoulders 20. For the purpose of tightening the escutcheon in its double bayonet connection the same may be provided with a recess 27 adapted to receive a tool by means of which it can be turned.

Means are provided for locking the escutcheon in its mounted position so that it will not come loose from the cup. This means takes the form of a clutch arrangement which permits the escutcheon to turn in one direction but binds so that the escutcheon will not turn in the opposite direction.

This means takes the form of a spring 30 disposed within the cup having an inwardly projecting end 31. The spring is so positioned that the projection 31 is approximately centrally of one of the recesses, as shown in Fig. 2. To assemble the handle and escutcheon, the escutcheon is moved into the cup with the projections 25 passing through apertures 18, and at this time, as shown in Fig. 7, the projection 31 of the spring is engaged in one of the recesses 26 in the escutcheon.

The escutcheon is now turned to lock the projections behind the flanges 17 and preferably the arrangement is such that it is turned to the right. The escutcheon is turned from the position shown in Fig. 7 to the position shown in Fig. 8, and in so doing the spring 30 is rotated in the cup by a pulling action inasmuch as the same is pulled around by reason of the projection 31 resting in the recess 26. The escutcheon is turned until the cam surfaces effect a tight engagement of the escutcheon. The parts are now in the position shown in Fig. 8, and this is the normal mounted position.

Any force which tends to turn the escutcheon back to the left, which is a turning movement reverse to that in which it was mounted, is opposed by the spring 30. A left turning movement of the escutcheon tends to expand the spring 30, inasmuch as there is a pushing action on the spring at the projection 31. This effects an expanding tendency on the spring and causes the same to grip against the interior walls of the cup.

Thus, briefly, this construction may be summarized as involving a bayonet type connection in conjunction with a clutch which is arranged to permit relative turning movement of the parts to effect a connection between the escutcheon and the cup, but which resists relative turning movement reverse to that of the first relative movement, to hold the parts in connected positions.

In Fig. 9 there is shown a remote control mechanism 40 which may include a plate 41 secured to the lockboard. Mounted on this plate is a cup member which may be flanged as at 42 and secured to the plate by means of the metal of the plate being disposed through the apertures of the flange, and riveted as at 43. This cup member embodies a cup portion 44 with double bayonet slots, cam surfaces and locking clutch spring, all of which are identical in construction with the construction above described. The remote control handle 45 is journaled in its escutcheon 46, and this escutcheon is formed similarly to escutcheon 22 for attachment to the cup. The hub of the handle may be internally serrated to fit over the serrated end 47 of the rock shaft of the remote control mechanism.

It will be apparent how the assembly is completed after the window regulator mechanism, lock structure or the like is secured to the wall of the automobile body. The escutcheon or rose having its handle journaled therein is merely connected to the cup member by the bayonet slot type connection. The spring clutch permits turning of the escutcheon to lock it to the cup but it binds against the reverse turning so as to prevent disassembly. The spring clutch shown herein is one which is more or less contracted to permit turning movement and which is more or less expanded thereby. But it is within the invention to construct an assembly wherein a spring binds when contracted and permits turning movement when expanded.

What I claim is:

1. In a handle mounting, the combination of a mounted member, a handle member, said members being provided with cooperating bayonet slot type connecting means, and means permitting relative rotational movement between the members to establish connection but frictionally resisting reverse relative movement whereby to hold the two members connected together.

2. In a handle mounting, the combination of a mounted member, a handle member, cooperating devices on the members by means of which the two members may be connected by relative turning movement, and means associated with one member so as to rotate relative to the other member and arranged to readily permit relative turning in one direction but which resists relative turning in the other direction.

3. In a handle mounting, the combination of a mounted member, a handle member, cooperating devices on the members by means of which the two members may be connected by relative turning movement, and a clutch device which permits relative rotation of the members to their connected positions but which binds to resist reverse movement thus to prevent detachment of the members.

4. In a handle mounting, the combination of a mounted member having a recess, a handle, an escutcheon in which the handle is journaled, a projection on the escutcheon having a part adapted to fit through the recess, said escutcheon and mounted member being arranged to be connected by relative turning movement to disalign the said part with the recess, and a spring associated with the mounted member and escutcheon and frictionally engaging one, said spring being arranged to permit relative rotation for attachment purposes but being arranged to increase its frictional engagement to resist reverse movement whereby to hold the mounted member and escutcheon in connected positions.

5. In a handle mounting, the combination of a mounted member having an aperture and spaced recesses in the aperture, means forming cam surfaces adjacent the recesses, a handle, an escutcheon in which the handle is journaled, said escutcheon having a hub part adapted to be placed in the said aperture, said part having projections for passing through the recesses, said escutcheon and mounted part being connected together by relative turning movement to position the projections under the cam surfaces, and a spring clutch device in the mounted member associated with the mounted member and escutcheon in such a manner as to frictionally engage one and to rotate with the other, this spring clutch device permitting relative rotation for attachment purposes but resisting reverse rotation.

6. In a handle mounting, the combination of a mounted member of cup form having a central aperture provided with spaced recesses, a flange bounding the aperture, a normally expanding spring within the cup, a handle, an escutcheon in which the handle is mounted, said escutcheon having a part adapted to be received in the aperture, projections on the part adapted to pass through the spaced recesses, interengaging means on a projection and the spring, said escutcheon and cup being connected by relative turning movement to position the projections under the flange, in which movement said spring is rotated in the cup, said spring however being arranged to bind against the walls of the cup to resist reverse relative rotation whereby to hold the parts in connected position.

7. In a handle mounting, the combination of a mounted member of cup form having a central aperture provided with spaced recesses, a flange bounding the aperture, a normally expanding spring within the cup, a handle, an escutcheon in which the handle is mounted, said escutcheon having a part adapted to be received in the aperture, projections on the part adapted to pass through the spaced recesses, interengaging means on a projection and the spring, said escutcheon and cup being connected by relative turning movement to position the projections under the flange in which movement said spring is rotated in the cup, said spring however being arranged to bind against the walls of the cup to resist reverse relative rotation whereby to hold the parts in connected position, said inter-engaging means between the spring and escutcheon consisting of an inturned end of the spring with a notch in the projection on the escutcheon in which the said inturned end is received.

8. Means for mounting an escutcheon of a handle or the like, comprising a cup member provided with double bayonet type slots, a normally expanding spring in the cup member, an escutcheon having a hub for reception in the cup member, projections on the hub for passing through the recesses, means connecting the hub with the spring, said hub and cup member being attachable by relative rotative movement, the said spring by reason of its connection with the hub being adapted to move with the hub as it is rotated to be connected, said spring however resisting reverse rotative movement of the hub whereby to hold the same in connected position as regards the cup.

9. Means for mounting an escutcheon of a handle or the like, comprising a cup member provided with double bayonet type slots, a normally expanding split spring in the cup member, an escutcheon having a hub for reception in the cup member, projections on the hub for passing through the recesses, means connecting the hub with one end of the spring, said hub and cup member being attachable by relative rotative movement, said spring being positioned so that upon rotation of the escutcheon for attachment purposes the spring is drawn with the escutcheon with a tendency to contract the same, and upon reverse relative rotative movement, the spring is given a pushing action whereby the tendency is to expand the spring so that it frictionally engages the cup member to prevent such movement.

In testimony whereof I affix my signature.

JOHN B. FLYNN.